United States Patent
Hsieh

(10) Patent No.: US 6,565,778 B2
(45) Date of Patent: May 20, 2003

(54) METHOD FOR MAKING PROTOTYPE MOLDS BY RECYCLED MATERIAL

(76) Inventor: Te-Ming Hsieh, 156, Zhong-Shan Rd., Feng-Yuan City, Taichung Hsien (TW)

( * ) Notice: Subject to any disclaimer, the term of this patent is extended or adjusted under 35 U.S.C. 154(b) by 101 days.

(21) Appl. No.: 09/777,645

(22) Filed: Feb. 6, 2001

(65) Prior Publication Data

US 2002/0105109 A1 Aug. 8, 2002

(51) Int. Cl.⁷ .................. B29B 11/06; B29B 13/10; B29C 35/16
(52) U.S. Cl. .................. 264/28; 264/109; 264/161; 264/219; 264/337; 264/37.1
(58) Field of Search .................. 264/28, 37.1, 219, 264/337, 109, 161

(56) References Cited

FOREIGN PATENT DOCUMENTS

| | | | |
|---|---|---|---|
| CN | 1249219 | * | 4/2000 |
| TW | 372214 A | * | 10/1999 |
| TW | 407095 | * | 10/2000 |

* cited by examiner

Primary Examiner—Stephen J. Lechert, Jr.
(74) Attorney, Agent, or Firm—Charles E. Baxley

(57) ABSTRACT

A method for making a prototype mold includes step 1: to prepare thermoplastic liquid by mixing hollow particles and resin; step 2: to crush used prototype molds into 5 mm to 10 mm particles; step 3: to mix the crushed particles in step 2 with the thermoplastic liquid; step 4: to eliminate bubbles in the mixture of the thermoplastic liquid and the crushed particles; step 5: to pour the mixture of the thermoplastic liquid and the crushed particles in a mold to make a product; step 6: to heat the product in step 5 at 60 to 200 degrees Celsius for 0.5 to 120 hours; step 7: to heat the product in step 6 at 60 to 80 degrees Celsius for 8 to 12 hours to obtain a stable crystal structure; step 8: to take the product from the mold, and step 9: to trim the product.

10 Claims, 7 Drawing Sheets

METHOD FOR MAKING PROTOTYPE MOLDS BY RECYCLED MATERIAL

FIELD OF THE INVENTION

The present invention relates to a method for making a prototype mold by recycled material and the prototype mold is easily to be machined and friendly to the environment.

BACKGROUND OF THE INVENTION

A conventional prototype is generally made by a prototype mold which is generally made by wood or metal. The wooden prototype mold can be easily machined to change its shape to meet the requirements of the designers. However, the wooden prototype mold tends to be deformed and absorb moisture. Besides, the wooden prototype mold cannot bear load so that it is not satisfied when more tests are to be applied to the wooden prototype mold. Although the metal prototype mold has better ability to bear load on it, it is difficult to be machined. Furthermore, the metal prototype mold is heavy and costly. Therefore, neither the wooden prototype mold or the metal prototype mold satisfies the needs of the manufacturers.

Applicant has invented a material for making the prototype molds and the material is a mixture of hollow particles and resin. The material is disclosed in a Taiwanese patent application number 85108891 and the application now is published. Nevertheless, the material is not recycled and reused.

The present invention intends to provide a method for making a prototype mold by recycled material and the prototype mold employs used/recylced mold material.

SUMMARY OF THE INVENTION

In accordance with one aspect of the present invention, there is provided a method for making a prototype mold and the method comprising the following steps:

step 1: to prepare thermoplastic liquid by mixing hollow particles and resin;

step 2: to crush used prototype molds into 5 mm to 10 mm particles;

step 3: to mix the crushed particles in step 2 with the thermoplastic liquid;

step 4: to eliminate bubbles in the mixture of the thermoplastic liquid and the crushed particles;

step 5: to pour the mixture of the thermoplastic liquid and the crushed particles in a mold to make a product;

step 6: to heat the product in step 5 at 60 to 200 degrees Celsius for 0.5 to 120 hours;

step 7: to heat the product in step 6 at 60 to 80 degrees Celsius for 8 to 12 hours to obtain a stable crystal structure;

step 8: to take the product from the mold, and step 9: to trim the product.

The primary object of the present invention is to provide a method for making a prototype mold by using recycled material.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 5:
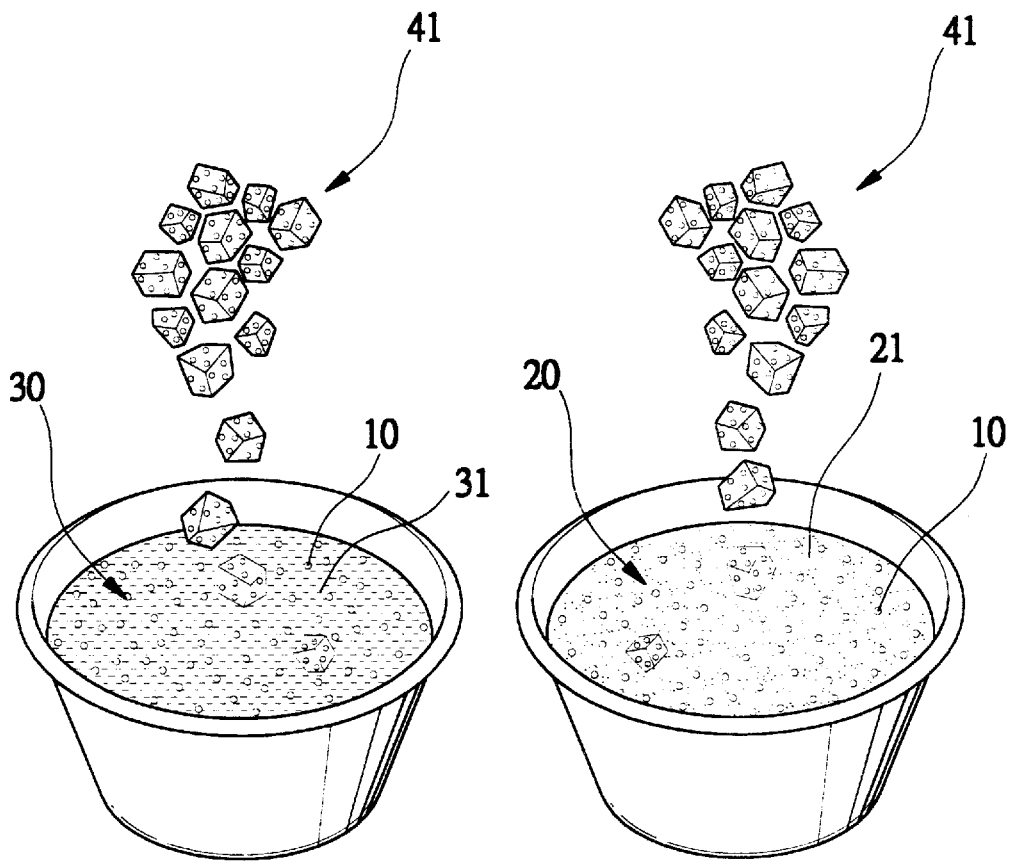
FIG. 5 is an illustrative view to show that the crushed particles are respectively mixed with the thermoplastic liquid and the thermosetting liquid.
Figure 6:
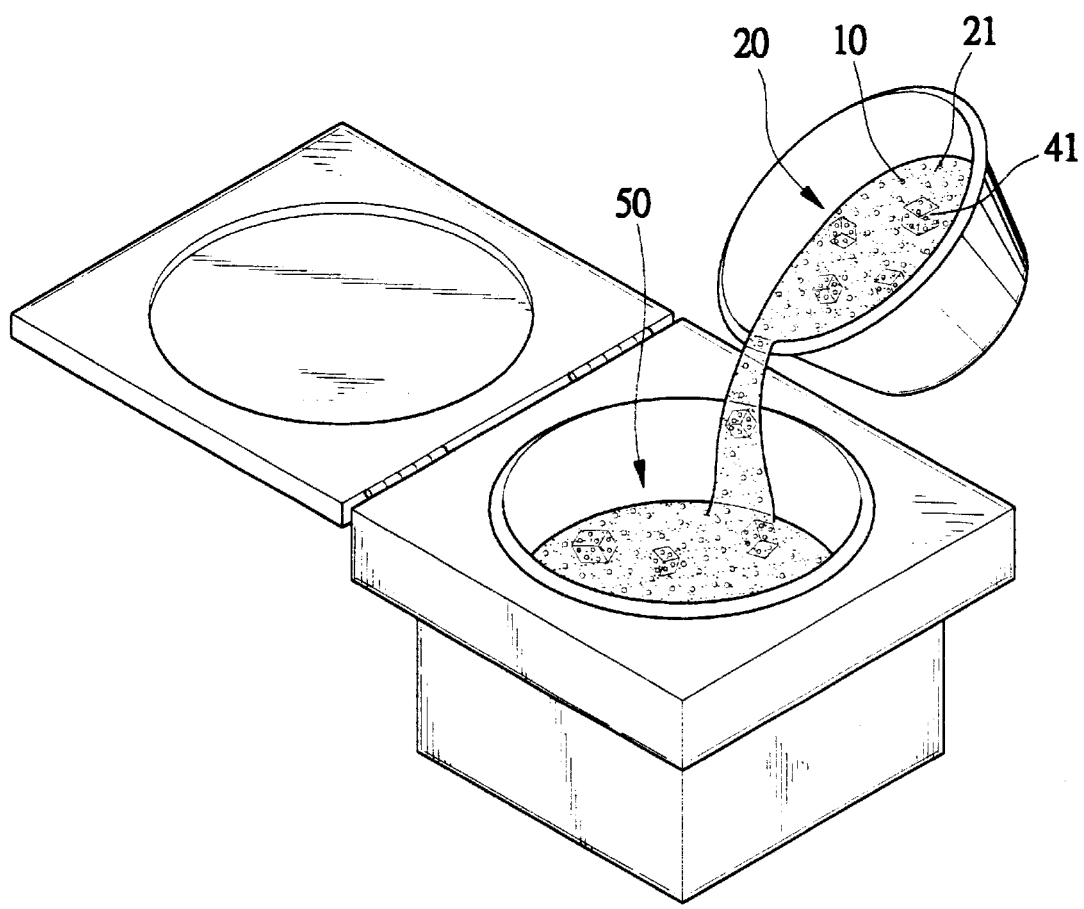
FIG. 6 is an illustrative view to show that the mixture of the thermoplastic liquid and the crushed particles is poured into a mold.
Figure 7:
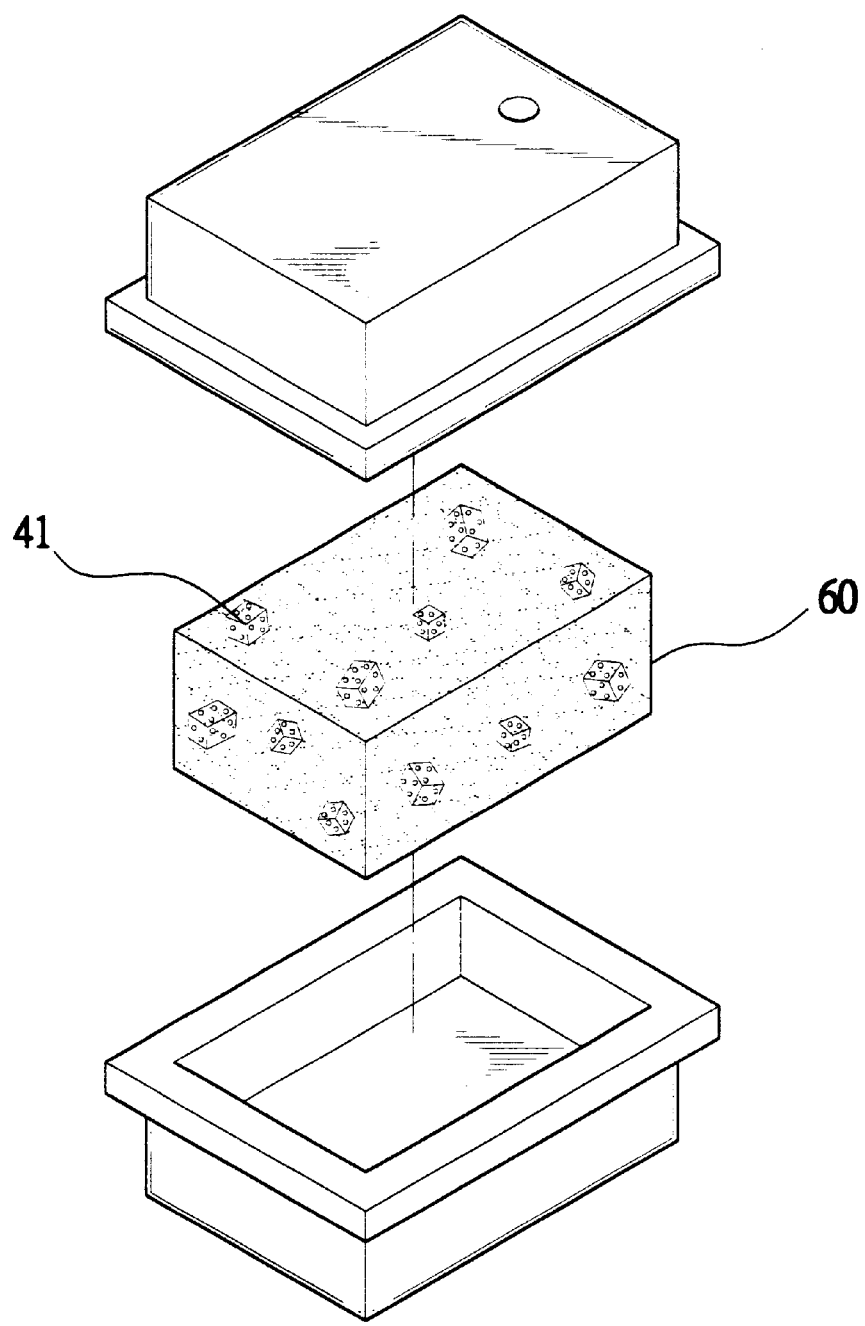
FIG. 7 shows a product made by the method is removed from molds.

The method for making a prototype mold of the present invention comprises the following steps:

step 2: to crush used prototype molds 40 made of plastic, glass particles, resin or ceramic into 5 mm to 10 mm particles 41 which involve hollow particles 10 as shown in FIG. 5;

step 2: to crush used prototype molds 40 into 5 mm to 10 mm particles 41 which involve hollow particles 10 as shown in FIG. 5;

step 3: to mix the crushed particles 41 in step 2 with the thermoplastic liquid 20 as shown in FIG. 6;

step 4: to eliminate bubbles in the mixture 50 of the thermoplastic liquid 20 and the crushed particles 41 by suitable methods such as chemical method, vacuum method or other mechanical methods;

step 5: to pour the mixture 50 of the thermoplastic liquid and the crushed particles in a mold to make a product as shown in FIG. 7;

step 6: to heat the product in step 5 at 60 to 200 degrees Celsius for 0.5 to 120 hours;

step 7: to heat the product in step 6 at 60 to 80 degrees Celsius for 8 to 12 hours to obtain a stable crystal structure;

step 8: to take the product 60 from the mold as shown in FIG. 8, and step 9: to trim the product.

The product made by the method of the present invention involves crushed particles 41 and hollow particles 10 which are combined by resin 21. There are gaps between the hollow particles 10 and the crushed particles 41 so that the product has a physical feature is between wood and metal. The product is light in weight and has enough strength and does not absorb water and is not easily to be deform.

Figure 1:
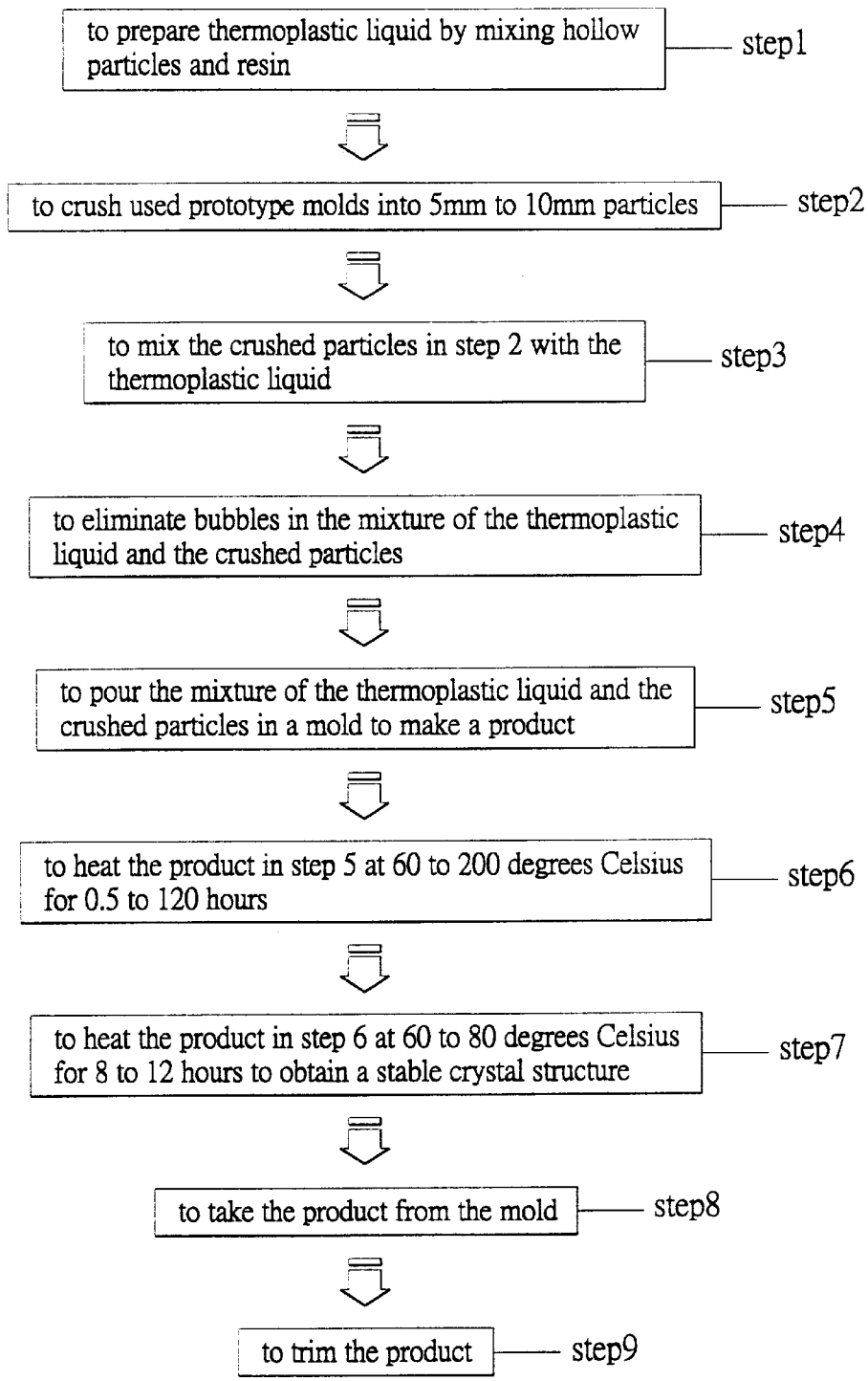
FIG. 1 is an illustrative view to show that the thermoplastic liquid is made by mixing hollow particles and resin.
Figure 2:
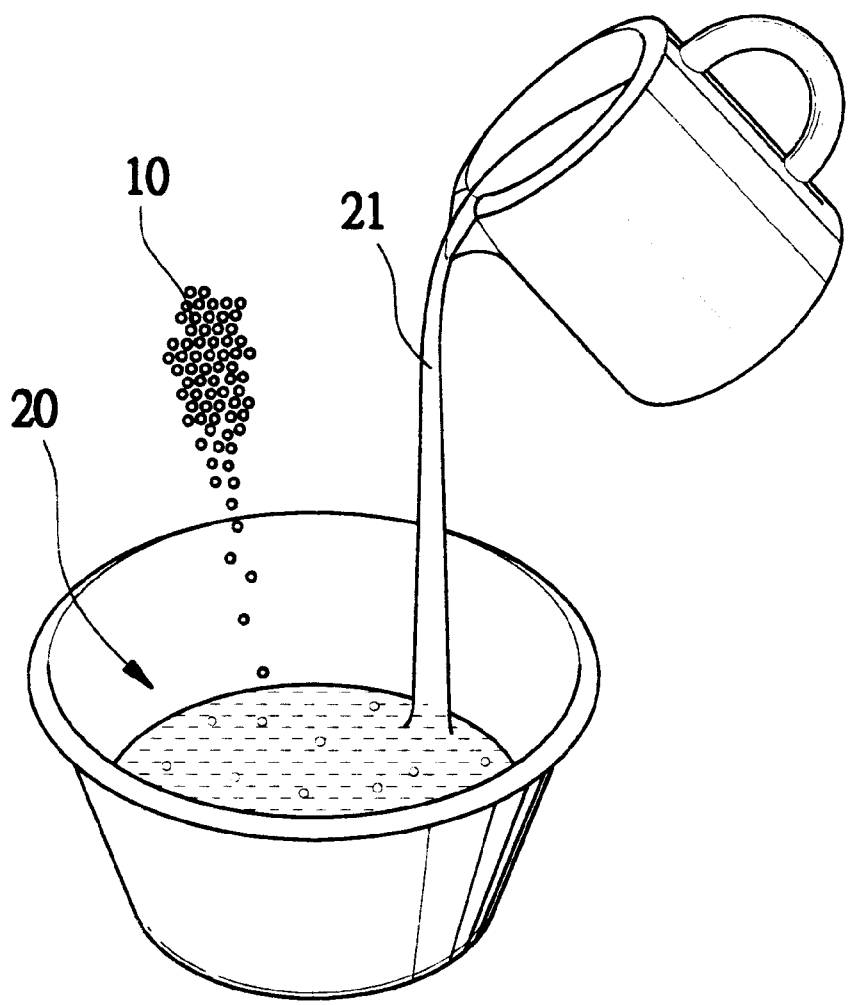
FIG. 2 is an illustrative view to show that the thermosetting liquid is made by mixing hollow particles and solidifying agent.
Figure 3:
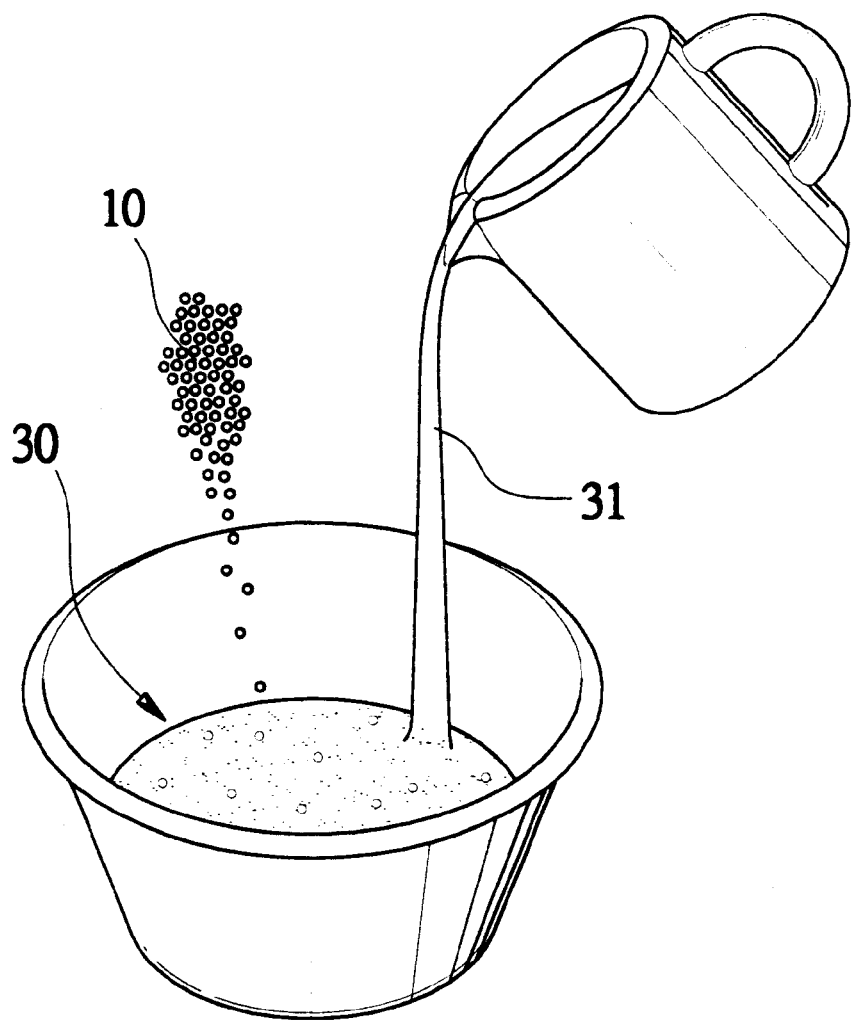
FIG. 3 is an illustrative view to show mixing the ingredients.
Figure 4:
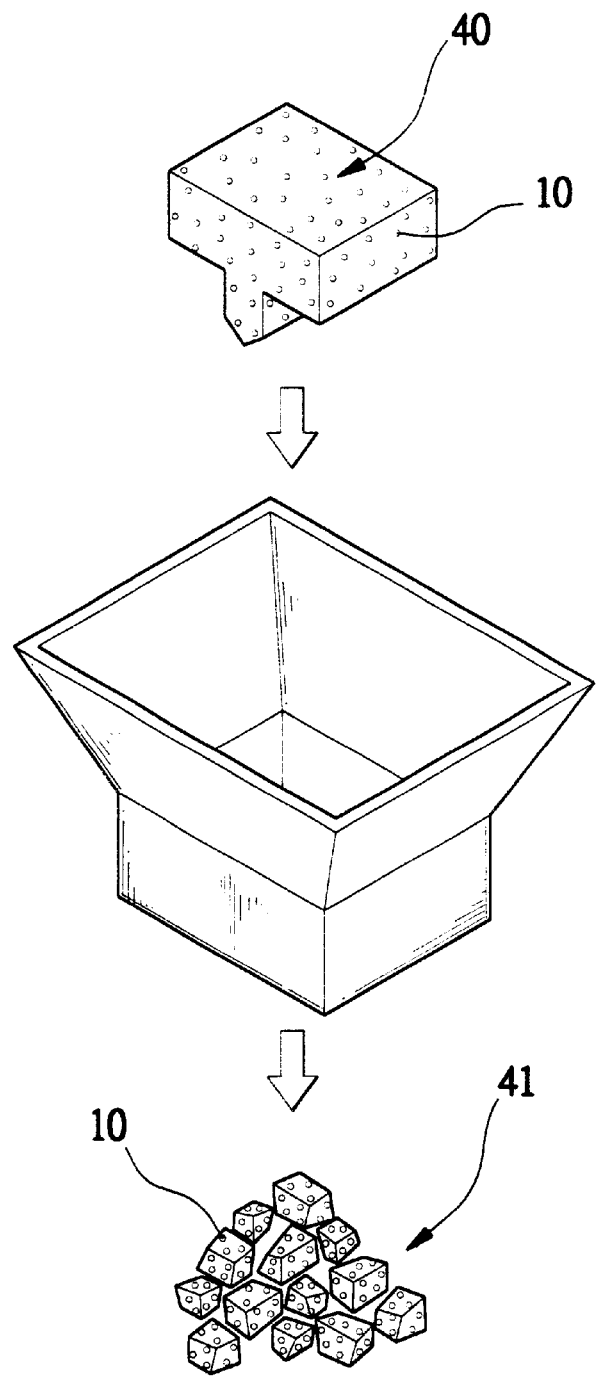
FIG. 4 is an illustrative view to show that used mold is crushed into crushed particles.

It is to be noted that the thermoplastic liquid 20 can be replaced by thermosetting liquid 30 which is made by mixing hollow particles 10 and solidifying agent 31 as shown in FIG. 3. The thermoplastic liquid 20 and the thermosetting liquid 30 are able to be mixed with each other to proceed the method so as to have required features of the product.

The resin 21 used in the method can be polyester, epoxide resin, polyestene polymer, or polypropylene polymer. The hollow particles 10 can be hollow ceramic particles, hollow glass particles, or hollow resin particles. The process in step 6 may also be made in different time and sections.

While we have shown and described various embodiments in accordance with the present invention, it should be clear to those skilled in the art that further embodiments may be made without departing from the scope and spirit of the present invention.

What is claimed is:

1. A method for making a prototype mold, comprising:

step 1: preparing thermoplastic liquid by mixing hollow particles and resin;

step 2: crushing used prototype molds made of plastic, glass particles, resin or ceramic into 5 mm to 10 mm particles;

step 3: mixing the crushed particles in step 2 with the thermoplastic liquid;

step 4: eliminating bubbles in the mixture of the thermoplastic liquid and the crushed particles;

step 5: pouring the mixture of the thermoplastic liquid and the crushed particles in a mold to make a product;

step 6: heating the product in step 5 at 60 to 200 degrees Celsius for 0.5 to 120 hours;

step 7: heating the product in step 6 at 60 to 80 degrees Celsius for 8 to 12 hours to obtain a stable crystal structure;

step 8: taking the product from the mold, and step 9: trimming the product.

2. The method as claimed in claim 1, wherein the resin is polyester.

3. The method as claimed in claim 1, wherein the resin is epoxide resin.

4. The method as claimed in claim 1, wherein the resin is polyestene polymer.

5. The method as claimed in claim 1, wherein the resin is polypropylene polymer.

6. The method as claimed in claim 1, wherein the hollow particles are hollow ceramic particles.

7. The method as claimed in claim 1, wherein the hollow particles are hollow glass particles.

8. The method as claimed in claim 1, wherein the hollow particles are hollow resin particles.

9. The method as claimed in claim 1, wherein the process in step 6 is made in different time and sections.

10. A method for making a prototype mold, comprising:

step 1: preparing thermosetting liquid by mixing hollow particles and solidifying agent;

step 2: crushing used prototype molds made of plastic, glass particles, resin or ceramic into 5 mm to 10 mm particles;

step 3: mixing the crushed particles in step 2 with the thermosetting liquid;

step 4: eliminating bubbles in the mixture of the thermosetting liquid and the crushed particles;

step 5: pouring the mixture of the thermosetting liquid and the crushed particles in a mold to make a product;

step 6: cooling the product in step 5 at minus 5 to minus 20 degrees Celsius for 0.5 to 120 hours;

step 7: taking the product from the mold, and step 8: trimming the product.

* * * * *